C. N. HINER.
REEL FOR EYEGLASSES.
APPLICATION FILED MAY 15, 1912.
1,036,844.
Patented Aug. 27, 1912.
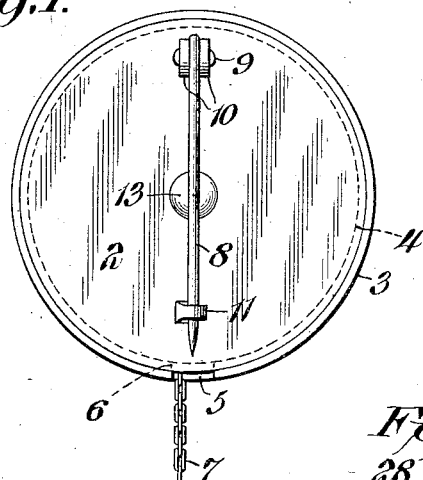
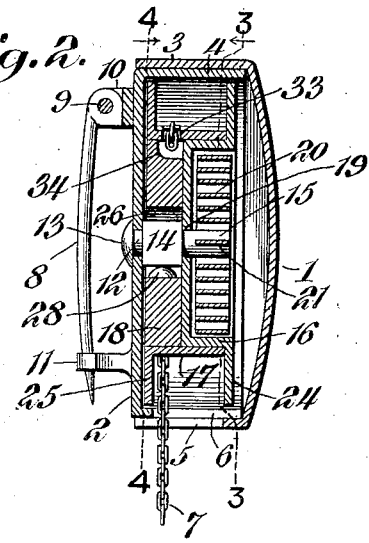
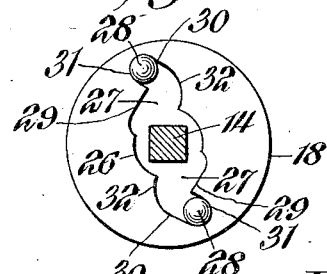
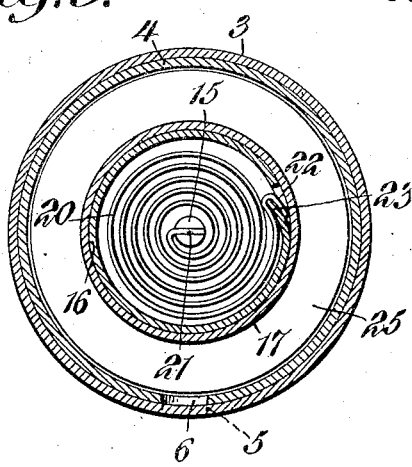
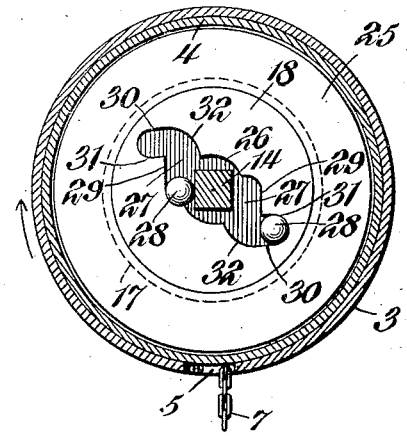
WITNESSES
Charles N. Hiner, INVENTOR,
BY
ATTORNEY

UNITED STATES PATENT OFFICE.

CHARLES N. HINER, OF STAUNTON, VIRGINIA.

REEL FOR EYEGLASSES.

1,036,844.

Specification of Letters Patent.

Patented Aug. 27, 1912.

Application filed May 15, 1912. Serial No. 697,537.

*To all whom it may concern:*

Be it known that I, CHARLES N. HINER, a citizen of the United States, residing at Staunton, in the county of Augusta and State of Virginia, have invented a new and useful Reel for Eyeglasses, of which the following is a specification.

The invention relates to improvements in reels for eyeglasses.

The object of the present invention is to improve the construction of reels for eyeglasses, and to provide a simple, inexpensive and efficient eyeglass reel of strong and durable construction, equipped with a clutch controlled spring actuated drum, and adapted to be pinned to the person in any position without interfering with the operation of the clutch.

A further object of the invention is to provide an eyeglass reel of this character, adapted to permit the spring to wind up slowly a chain or cord attached to the eyeglasses without requiring a succession of quick jerks to secure such result.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a rear elevation of an eyeglass reel, constructed in accordance with this invention. Fig. 2 is a central vertical sectional view of the same. Fig. 3 is a transverse sectional view on the line 3—3 of Fig. 2. Fig. 4 is a similar view on the line 4—4 of Fig. 2. Fig. 5 is a detail sectional view, taken similar to Fig. 4, but showing another position of the ratchet plate and the balls.

Like numerals of reference designate corresponding parts in all the figures of the drawing.

In the accompanying drawing in which is illustrated the preferred embodiment of the invention, the eyeglass reel is equipped with a casing preferably composed of front and rear approximately cylindrical sections 1 and 2, having peripheral portions 3 and 4 of uniform width fitted together, as clearly illustrated in Fig. 2 of the drawing, and provided at the bottom with registering openings 5 and 6 for the passage of a cord or chain 7. The sections 1 and 2 of the casing are preferably retained in place through frictional engagement in order to afford ready access to the interior of the eyeglass reel, but they may be of any other preferred construction and be secured together in any desired manner. The casing is provided at its back with an attaching pin 8, pivoted at one end by a rivet 9, or other suitable fastening device between a pair of projecting ears 10, and having its other end engaged with an approximately hook-shaped keeper 11. The ears 10 preferably consist of a bifurcated stud or piece, soldered or otherwise secured to the rear section of the casing, and the keeper 11 is preferably fixed to the rear section in a similar manner. The rear section of the casing is provided with a central opening receiving a reduced portion 12 of a center post 13, which is headed at the outer face of the rear section, whereby it is rigidly secured to the same. The center post is provided with a rear polygonal portion 14 and a front round portion 15 of less diameter than the rear polygonal portion 14 and receiving a rotary drum, which fits against the shoulder formed by the front end of the polygonal portion. The rotary drum is composed of a cylindrical body 16 and a cylindrical section 17 fitted on the peripheral portion of the cylindrical body and extending rearwardly beyond the same, the cylindrical section 17 being of greater width than the cylindrical body to provide a space or recess for the reception of a clutch plate or disk 18. The cylindrical body 16 is provided with a central opening 19 through which the round portion 15 of the center post passes, and the drum is retained on the center post by means of a flat coiled spring 20, having its inner end secured in a slot or bifurcation 21 of the said post and provided at its outer end with a hook 22, which engages an inwardly projecting tongue or portion 23 of the drum. The tongue 23 is integral with the peripheral portion of the cylindrical body and is formed by partially severing the metal and bending the same inwardly, as clearly shown in Fig. 3 of the drawing. The spring, which actuates the drum, is received within the cylindrical body of the same. The cylindrical body is provided with an annular peripheral flange 24, arranged at the front of its peripheral portion, and the cylindrical section 17 is provided at the back with a corresponding annular peripheral flange 25, the flanges 24 and 25 forming an annular groove or space for the reception of the cord or chain 7.

The clutch plate or disk 18, which is pressed into the cylindrical section 17, is preferably retained therein through frictional engagement, and it is provided with a central opening 26 receiving the polygonal portion 14, which is preferably square. The clutch disk is provided with one or more slots or extensions 27 of the central opening 26 and each of the radially extending slots or portions is adapted to receive a ball 28 for engaging the rear face of the polygonal portion of the fixed post. As the post is square and presents a plurality of flat faces, the eyeglass reel may be pinned to a garment with the pin in a vertical or any other position without affecting the operation of the clutch. The radial branch or extension of the central opening has a straight rear wall 29, and when the same is arranged in an approximately upright position in spaced relation with the rear face of the polygonal post and the ball is in the lower portion of the radial branch, as illustrated at the right hand side of Fig. 4 of the drawing, the ball will operate as a lock and will prevent rotation of the drum in the direction of the arrow.

Each of the radial branches or extensions of the central opening is provided at its outer end with a slot 30, extending rearwardly or in the direction opposite to that in which the drum rotates, and adapted to receive the ball and forming a seat 31 for the same. The wall or seat 31, which supports the ball in the upward forward movement of the same, is arranged preferably at an angle slightly less than at right angles to the straight rear wall 29 of the radial branch, but the angle may be varied to secure the desired locking action of the clutch of the eyeglass reel. When it is desired to start the drum from the locked position shown in Fig. 4, the chain is pulled upon and the drum is moved backwardly a sufficient distance to permit the ball to drop into the slot 30. The chain is then slackened or released to permit the spring to rotate the drum, and the centrifugal force incident to the rotary movement of the drum will maintain the ball in the slot 30, and this together with the particular arrangement of the slot will enable the chain to be wound up as slowly as desired, as the ball even when the drum rotates at too slow a speed to cause the ball to be affected by centrifugal force, will not drop from its seat until it is carried upward to approximately the position illustrated in Fig. 5 of the drawing. The ball in dropping from such position, falls upon the upper face of the polygonal portion of the center post and is carried forward and prevented from engaging the rear face of the said post and forming a lock for holding the drum against rotary movement. When, however, it is desired to lock the drum, the chain is pulled upon and the drum is rotated rearwardly a sufficient distance to carry the straight face 29 of the radial branch or portion of the opening to a position in rear of the center post. This will cause the ball to drop into the radial branch and lock the drum.

While any number of balls and radial branches may be employed, it is preferable to provide two diametrically opposite branches, as illustrated in the drawing in order that the drum may be locked at each half revolution. The front wall 32 of the radial branch or portion of the opening is curved and extends from the front wall of the slot 30 to the adjacent curved wall of the central opening 26.

The section 17 of the drum is provided with an opening 33 to receive the inner end of the chain, and the clutch disk or plate is provided at the said opening 33 with a peripheral recess 34, the chain being preferably secured thereto by a drop of solder.

What is claimed is:—

1. An eyeglass reel including a casing, a center post fixed to the casing and having a polygonal portion, a spring actuated drum mounted on the center post, a clutch plate carried by the drum and provided with a central opening receiving the polygonal portion of the center post and having a radial extension provided with a straight rear wall arranged in spaced relation with the center post, and a ball operating in the radial branch of the opening of the clutch plate, the latter being also provided at the outer end of the radial branch with a rearwardly extending slot of a size to receive the ball and forming a seat for the ball and adapted to carry the same upward to an elevated position to cause the ball to drop upon the top of the polygonal portion of the center post and be carried forward, whereby the drum may be operated with a slow continuous movement.

2. An eyeglass reel including a casing, a center post fixed to the casing and having a front rounded portion and provided with a rear polygonal portion, a drum mounted on the rounded portion of the center post and comprising a cylindrical body provided at the front with an outwardly extending peripheral flange, and a cylindrical section fitted on the cylindrical body and being of greater width than and extending rearwardly beyond the same and provided at the back with a peripheral flange spaced from the peripheral flange of the cylindrical body, a coiled spring arranged within the cylindrical body and having its terminals connected, respectively, with the center post and with the peripheral portion of the said body, a clutch disk arranged within the rearwardly projecting portion of the said cylindrical section of the drum and having an opening receiving the polygonal portion of the center post, a ball operating within the said opening and arranged to engage with the polygonal portion of the center post to stop the drum, and a flexible connection, connected with and adapted to be wound on the drum between the said peripheral flanges.

In testimony that I claim the foregoing as my own, I have hereto affixed my signature in the presence of two witnesses.

CHARLES N. HINER.

Witnesses:
S. B. STEPHENSON,
FRED O. HINER.